United States Patent [19]

Nishi et al.

[11] Patent Number: 5,653,627

[45] Date of Patent: Aug. 5, 1997

[54] FLAT DIAMOND DRILL

[75] Inventors: Mizuki Nishi; Yukihiro Watanabe; Mamoru Kitamura; Yutaka Matsui, all of Matsusaka, Japan

[73] Assignee: Central Glass Company Limited, Ube, Japan

[21] Appl. No.: 467,676

[22] Filed: Jun. 6, 1995

Related U.S. Application Data

[62] Division of Ser. No. 112,994, Aug. 27, 1993, abandoned.

[30] Foreign Application Priority Data

| Aug. 28, 1992 | [JP] | Japan | 4-229760 |
| Oct. 16, 1992 | [JP] | Japan | 4-278898 |

[51] Int. Cl.⁶ ............................... B24B 5/06; B23B 27/20
[52] U.S. Cl. .................... 451/540; 451/541; 451/547; 408/145; 408/228
[58] Field of Search .................... 408/145, 228; 451/41, 44, 53, 58, 61, 450, 540, 541, 547

[56] References Cited

U.S. PATENT DOCUMENTS

| 2,264,922 | 12/1941 | Hooser | 408/228 X |
| 4,124,367 | 11/1978 | Reese et al. | |
| 4,209,272 | 6/1980 | Miyanaga | |
| 4,383,785 | 5/1983 | Rice | |
| 4,467,168 | 8/1984 | Morgan et al. | |
| 4,703,591 | 11/1987 | Herrington et al. | |
| 4,720,218 | 1/1988 | DeFries et al. | 451/541 X |
| 4,800,686 | 1/1989 | Hirabayashi et al. | 451/541 X |
| 4,940,675 | 7/1990 | Bohlayer et al. | |
| 5,065,647 | 11/1991 | Johnson | 408/145 X |
| 5,123,217 | 6/1992 | Ishikawa et al. | 451/541 |
| 5,354,155 | 10/1994 | Adams | 408/145 |

FOREIGN PATENT DOCUMENTS

| 60-183157 | 12/1985 | Japan |
| 63-127875 | 8/1988 | Japan |
| 63-166360 | 10/1988 | Japan |
| 63-166361 | 10/1988 | Japan |

*Primary Examiner*—Timothy V. Eley
*Attorney, Agent, or Firm*—Keck, Mahin & Cate

[57] ABSTRACT

A diamond drill consists of a core and a pair of abrasive diamond tips which are joined to constitute a diamond tip and core assembly in the form of a flat plate. The diamond tips have chamfering sections for providing a cutting blade of a diameter smaller than that of a cutting blade provided by finishing blade sections thereof. The chamfering sections can be used not only for chamfering an edge of a glass plate defining an opening but for cutting a non-circular opening. In another embodiment, an abrasive diamond ring is installed on a shank and used for chamfering an edge of a glass plate defining an opening or for cutting a non-circular opening having a small corner.

12 Claims, 5 Drawing Sheets

FLAT DIAMOND DRILL

This is a Divisional of application Ser. No. 08/112,994, filed Aug. 27, 1993 now abandoned.

BACKGROUND OF THE INVENTION

1. Field of the Invention

The present invention relates to a flat diamond drill for drilling openings in a glass plate, particularly a laminated glass for an automotive vehicle. Further, the present invention relates to a method of drilling an opening in a glass plate, particularly a non-circular opening, by using a flat diamond drill.

2. Description of the Prior Art

A diamond drill heretofore used for drilling an opening in a glass plate has a cutting blade or tip of a generally circular cross section. Such a prior art diamond drill is liable to be heated up to an extremely high temperature during drilling due to the difficulty of supplying a sufficient amount of coolant to the space between the cutting blade and the glass plate and due to the large area at which the cutting blade and the glass plate are held in contact with each other. This results in a difficulty of performing a desired drilling operation with efficiency. This is particularly true in case of drilling an opening in a laminated glass plate such as one having an interlayer of polyvinyl butyral.

SUMMARY OF THE INVENTION

According to an aspect of the present invention, there is provided a flat diamond drill for drilling an opening in a glass plate. The flat diamond drill comprises a shank, a core in the form of a flat plate and attached at a first longitudinal end to the shank for rotation therewith about an axis. The core has tapered sides opposed in the direction crossing the axis of rotation of the shank and the core. The flat diamond drill further comprises a pair of abrasive diamond tips composed of abrasive diamond grains, secured to the tapered sides of the core and cooperating with the core to constitute a tip and core assembly in the form of a flat plate. The diamond tips have a pair of finishing blade sections located adjacent the first longitudinal end of the core for providing a finishing blade of a first diameter corresponding to that of the opening to be formed in the glass plate, a pair of cutting-off end sections located adjacent a second longitudinal end of the core opposite to the first longitudinal end and protruding longitudinally outward therefrom for providing a cutting blade of a second diameter smaller than the first diameter, and a pair of cutting blade sections located between the cutting-off end sections and the finishing blade sections for providing a cutting blade which is convexly curved and of a diameter increasing gradually between the first and second diameters. The flat diamond drill further comprises coolant supplying means for supplying coolant to the diamond tips, having a passage extending through the shank and the core to provide an outlet at the second longitudinal end of the core.

According to another aspect of the present invention, there is provided a flat diamond drill which comprises a shank for attachment to a machine tool and a core in the form of a flat plate and attached at a first longitudinal end to the shank for rotation therewith about an axis. The core has tapered sides opposed in the direction crossing the axis of rotation of the shank and the core. The flat diamond drill further comprises a pair of abrasive diamond tips composed of abrasive diamond grains, secured to the tapered sides of the core and cooperating with the core to constitute a tip and core assembly in the form of a flat plate. The diamond tips have a pair of finishing blade sections located adjacent the first longitudinal end of the core for providing a finishing blade of a first diameter corresponding to that of the opening to be formed in the glass plate, a pair of cutting-off end sections located adjacent a second longitudinal end of the core opposite to the first longitudinal end and protruding longitudinally outward therefrom for providing a cutting blade of a second diameter smaller than the first diameter, a pair of cutting blade sections located between the cutting-off end portions and the finishing blade sections for providing a cutting blade which is convexly curved and of a diameter increasing gradually between the first and second diameters, and a pair of chamfering sections located more adjacent the first longitudinal end of the core than the finishing blade sections for providing a finishing blade of a diameter smaller than the first diameter. The flat diamond drill further comprises coolant supplying means for supplying coolant to the diamond tips, having a passage extending through the shank and the core to provide an outlet at the second longitudinal end of the core.

According to a further aspect of the present invention, there is provided a method of drilling a non-circular opening in a glass plate by using a flat diamond drill as described above. The method comprises the steps of moving the flat diamond drill only axially thereof against the glass plate and drilling a circular prepared opening, moving the flat diamond drill axially and laterally for bringing one of the chamfering sections of the flat diamond drill to contact with an edge of the glass plate defining the prepared opening, and moving the flat diamond drill laterally along a predetermined path for thereby drilling the non-circular opening by the chamfering sections.

The above described diamond drill is effective for solving the above noted problem inherent in the prior art diamond drill. Further, the above described method makes it possible to drill a non-circular opening of a high quality with ease and efficiency.

It is accordingly an object of the present invention to provide a flat diamond drill for drilling an opening in a glass plate, which makes it possible to obtain an opening, particularly a non-circular opening of a high quality with ease and efficiency.

It is a further object of the present invention to provide a flat diamond drill of the above described character which is particularly suited for drilling an opening in a laminated glass such as one having an interlayer of polyvinyle butyral.

It is a further object of the present invention to provide a method of drilling a non-circular opening in a glass plate by using a flat diamond drill, which makes it possible to obtain a non-circular opening of a high quality with ease and efficiency.

DETAILED DESCRIPTION OF THE PREFERRED EMBODIMENTS

Figure 1:
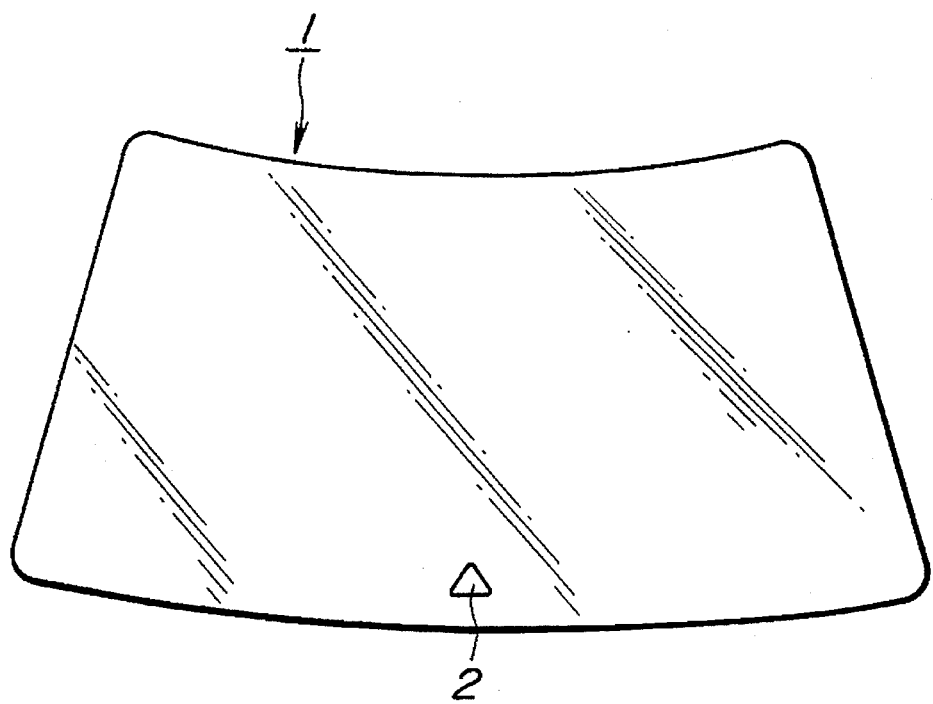
FIG. 1 is a plan view of a glass plate formed with a triangular opening by using a flat diamond drill of the present invention.
Figure 2:
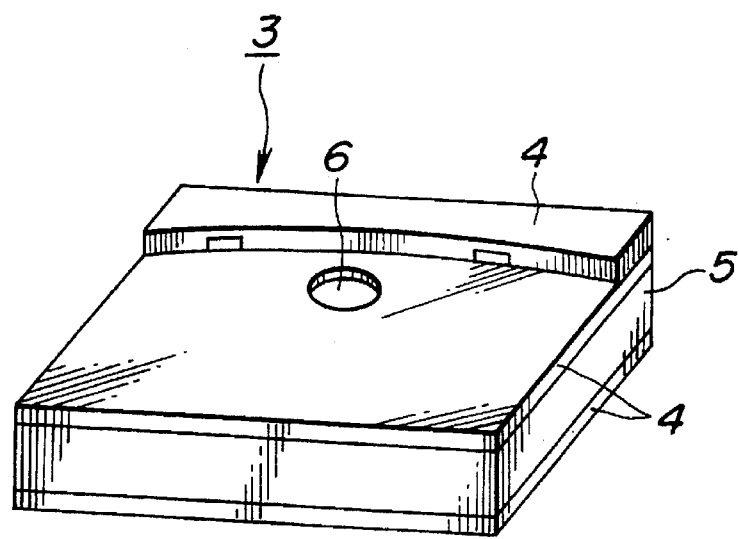
FIG. 2 is a perspective view of glass holder for supporting thereon a glass plate upon drilling the opening in the glass plate.
Figure 3:
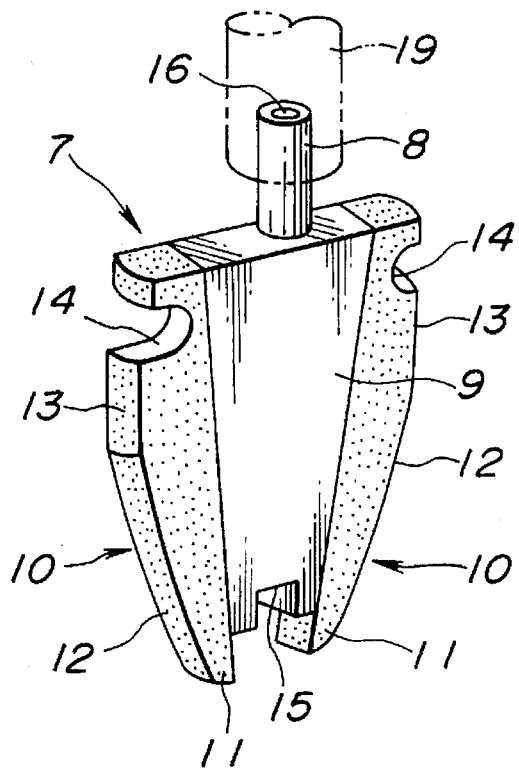
FIG. 3 is a perspective view of a flat diamond drill according to an embodiment of the present invention.

Referring first to FIGS. 1 to 4, indicated by 1 is a transparent float glass which is about 3.5 mm thick and cut to a predetermined size of 1400 mm×800 mm. In case of drilling an opening, for example a triangular opening 2, the glass place 1 is placed on a glass holder 3 in the form of a rectangular box. The glass holder 3 consists of horizontal holder members 4 made of Bakelite and vertical holder members 5 made of neoprene sponge and is formed with a clearance hole 6 for allowing a flat diamond drill 7 which will be described in detail hereinlater, to protrude therethrough into the glass holder 3.

The glass plate 1 is held stationarily on the glass holder 3 by means of a vacuum absorber (not shown) and a loading of about 12 Kg.

The flat diamond drill 7 includes a shank 8 for attachment to a machine tool 19, and a core 9 made of metal such as stainless steel and connected to the shank 8 for rotation therewith about an axis of rotation of the drill 7. The core 9 is in the form of a flat plate tapering toward an end opposite to an end where it is connected to the shank 8. The diamond drill 7 further includes a pair of abrasive diamond tips 10 composed of abrasive diamond grains and bonded or otherwise secured to the tapered sides of the core 9, respectively.

The diamond tips 10 cooperate with the core 9 to constitute a flat or planar plate assembly. More specifically, the diamond tips 10 are shaped so as to provide a pair of cutting-off end sections 11, a pair of cutting blade sections 12 tapered toward the cutting-off end sections 11 and convexly curved between the upper and lower ends, a pair of finishing blade sections 13 extending continuously from the cutting blade sections 12 and straightly in parallel to the axis of rotation of the drill 7, and a pair of notched or chamfering sections 14 adapted to provide a cutting blade of a smaller diameter than that of the finishing blade 13. The cutting-off end sections 11 and the cutting blade sections 12 are composed of abrasive diamond grains of the grain sizes, for example, ranging from No. 80 to No. 100, whilst the finishing blade sections 10 are composed of abrasive diamond grains of the grain sizes, for example, ranging from No. 170 to No. 230. The cutting-off end sections 11, cutting blade sections 12, finishing blade sections 13 and chamfering sections 14 are arranged symmetrically about the axis of rotation of the drill 7. The core 9 has at the end remoter from the shank 8 a notched portion 15. A passage 16 for supply of coolant is formed in the shank 8 and the core 19 to extend between the upper end of the shank 8 and the notched portion 15 of the core 9. The cutting-off end sections 11 are protruded more outward than the end of the core 9 having the notched portion 15.

In case of drilling a non-circular opening such as a triangular opening 2 in the glass plate 1, the flat diamond drill 7, for example, of the diameter D of about 7.8 mm, is attached by way of the shank 8 to the machine tool 19 and moved against the glass plate 1 to first drill a circular prepared opening 17 whilst supplying coolant into the passage 16. The drilling of the prepared opening 17 is performed under the condition in which the drill 7 is driven at the rotation speed of about 8,000 rpm and its feed rate is about 150 mm/min. During drilling, the coolant supplied into the passage 16 is discharged from an outlet (16a in FIG. 6) at the notched portion 15 of the core 9 for cooling the diamond tips 10 from the inside thereof. Thus, together with additional supply of coolant from the outside of the drill 7, it becomes possible to cool the drill 7 with efficiency and thus prevent the same from being heated up to an extremely high temperature with assuredness. In this connection, it is to be noted that due to the flat plate shape of the diamond drill 7 supply of a sufficient amount of coolant to the drill 7 and to the area of the glass plate 1 being drilled can be attained, thus enabling efficient cooling of the diamond drill 7 as well as efficient cooling and washing of the area of the glass plate 1 being drilled. In drilling, the cutting-off end sections 11 are first put into contact with the glass plate 1 to extend therethrough. Then, the cutting blade sections 12 are moved against the glass plate 1 to enlarge the opening drilled by the cutting-off end sections 11. Finally, the finishing blade sections 13 are moved against the glass plate 1 to protrude into the glass holder 3 through the clearance hole 6 and complete the drilling of the prepared opening 17.

Figure 4:
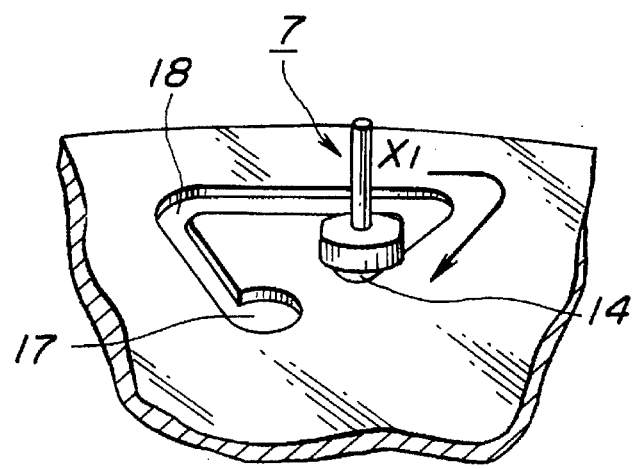
FIG. 4 is a perspective view for illustrating a process for drilling a non-circular opening in a glass plate by using the flat diamond drill of FIG. 3.

After the drilling of the opening 17, the drill 7 is controlled by a NC (numerical control) system in such a way as to drill an elongated cut 18 by using the chamfering portions 14, i.e., the drill 7 is moved axially and laterally and brought into contact at the chamfering sections 14 with the edge of the glass plate 1 defining the prepared opening 17 and then moved along a predetermined triangular path or locus and in the direction of the arrow X1 in FIG. 4 under the condition of the rotation speed of about 8,000 rpm and the feed rate of about 20 mm/min for thereby obtaining the elongated cut 18 and finally the triangular opening 2. In this instance, since the chamfering sections 14 are adapted to provide a cutting blade of a V-like or U-like shape, the edge of the glass plate 1 defining the triangular opening 2 is chamfered while being drilled.

The triangular opening 2 has three rounded corners of a radius of about 5 mm and three sides of about 50 mm, whilst having chamfered edges and therefore an excellent finish. With the flat diamond drill 7 of this invention, the triangular opening 2 can be drilled with efficiency and without any trouble.

In the meantime, a non-circular opening such as a triangular opening, square opening, oval opening, etc. in a glass plate is useful for fixedly holding a part, for example, in such a way as to prevent its rotation and movement. For example, a triangular opening in an automotive windshield or rear window glass is useful for fixedly holding a part of a wiper.

Figure 5:
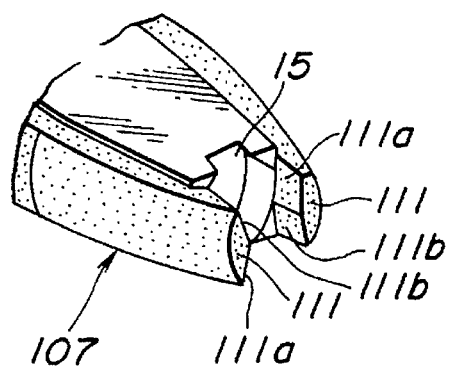
FIG. 5 is a fragmentary perspective view of a flat diamond drill according to a further embodiment of the present invention.
Figure 7:
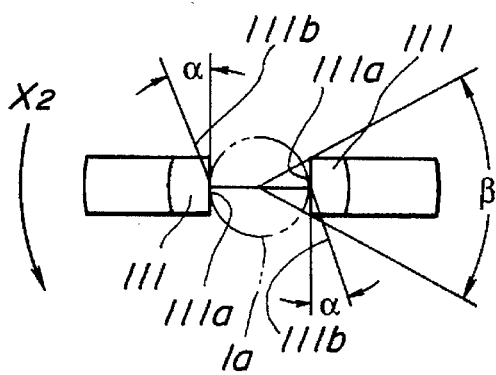
FIG. 7 is a plan view taken in the direction of the arrow VII of FIG. 6.
Figure 6:
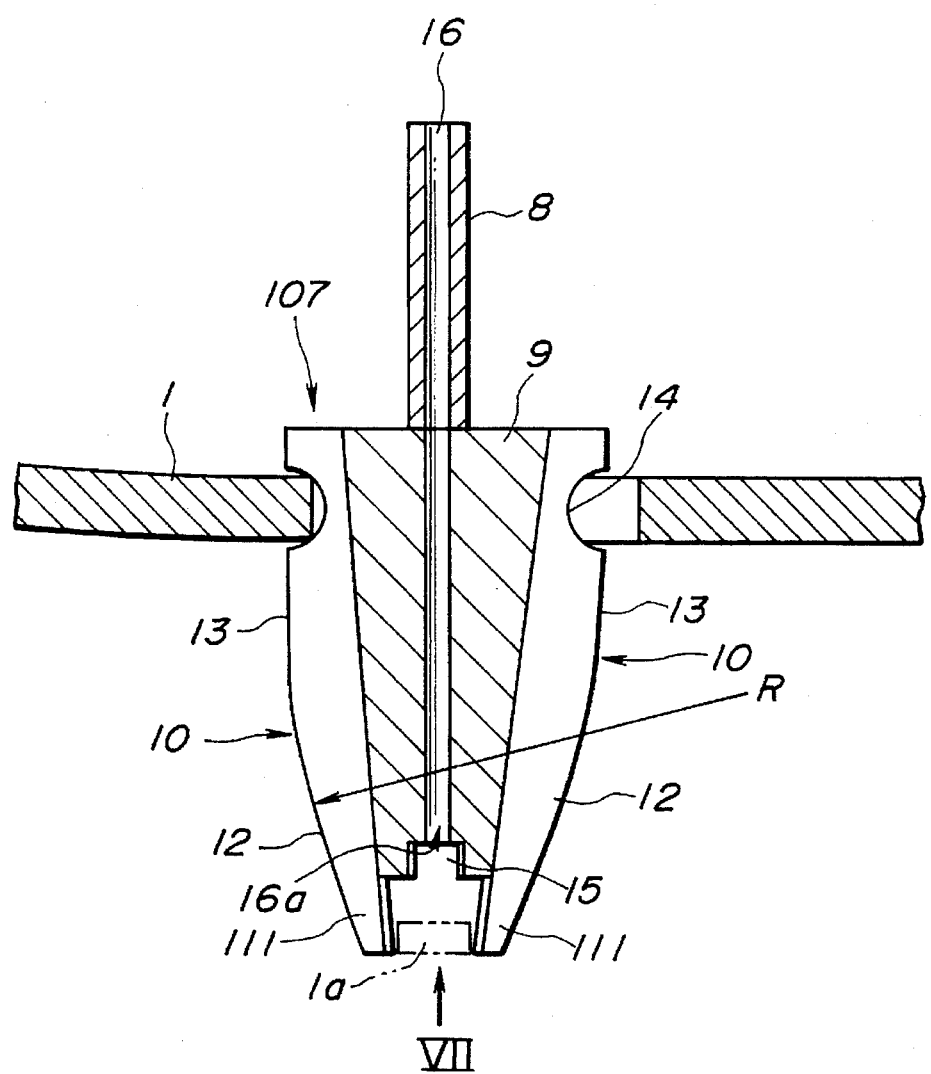
FIG. 6 is a sectional view of the flat diamond drill of FIG. 5.

FIGS. 5 to 7 show a flat diamond drill 107 according to another embodiment of the present invention. This embodiment differs from the previous embodiment of FIGS. 1 to 4 in that the cutting-off end sections 111 have opposed inner side surfaces which are tapered in the direction going away from the core 9 and consist of first surface portions 111a having nearest points or areas of the inner side surfaces and second surface portions 111b which are slanted outward with respect to the first surface portions 111a, i.e., slanted in such a way as to form an angle α with the first surface portions 111a, and in the direction opposite to the direction of rotation of the drill 7 as indicated by the arrow X2 in FIG. 7.

With this embodiment, a core 1a, cut off from the glass plate 1 when the cutting-off end sections 111 penetrate the glass plate 1, can be removed easily and automatically from the inner side surfaces of the cutting-off end sections 111 by the coolant striking against the core 1a. With a comparable prior art diamond drill, a difficult and time-consuming work is required for removing such a core from the drill.

In the meantime, in order to prevent sudden change of resistance to which the drill 107 is subjected during drilling, the cutting blade sections 12 of the diamond tips 10 have a convexly curved shape of a radius "R" of curvature within the range from about 1.5 to 2.5 times of a radius of an opening to be drilled (i.e., a radius of a cutting blade provided by the finishing blade sections 13). Further, in order to attain efficient drilling and an excellent life of a drill, the angle β in FIG. 7 is set within the range from 35° to 70°, i.e., the thickness of the diamond tips 10 is set in such a manner that the lines extending through the center of the core 1a in contact with the nearest points of the first surface portions 111a or the point equidistant from the nearest points of the first surface portions 111a, which nearest points are diametrically opposed with respect to the center of the core 1a or the axis of rotation of the drill 107, and through the opposite ends of one of the inner side surfaces when viewed in a plan view of FIG. 7 form an angle within the range from 35° to 70°.

As seen from FIG. 6, the chamferring sections 14 of the flat diamond drill 107 can be used for chamfering the edge of the glass plate defining a circular opening of a diameter corresponding to that of the cutting balde provided by the finishing sections 13. In this instance, it is to be noted that such chamferring can be attained with ease and efficiency since it can be attained with the same drill which is axially moved in one direction and without requiring an additional chamfering tool.

Figure 8:
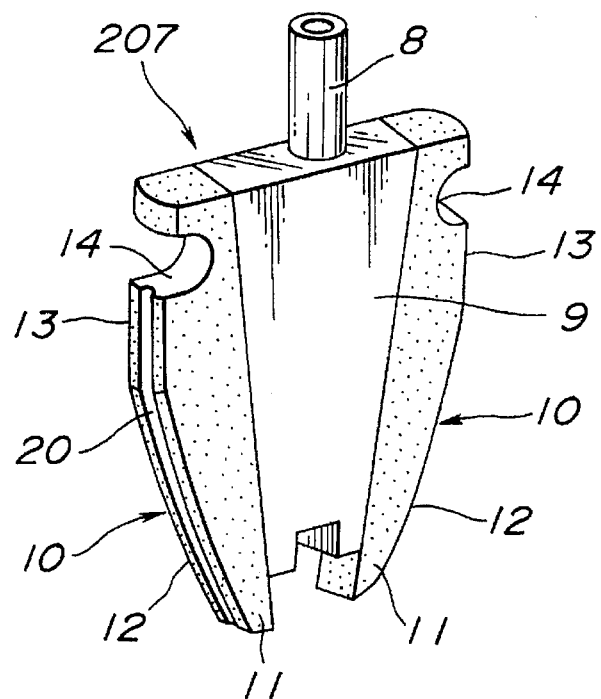
FIG. 8 is a perspective view of a flat diamond drill according to a further embodiment of the present invention.

FIG. 8 shows a flat diamond drill 207 according to a further embodiment of the present invention. This embodiment differs from the previous embodiment of FIGS. 1 to 4 in that each of the diamond tips 10 is formed with a groove 20 extending through the cutting-off end section 11, cutting blade section 12 and finishing section 13 for assisting in supplying coolant to the tip 10 and to the area of the glass plate 1 which is being drilled. This embodiment effects the more assured cooling of the drill.

Figure 9:
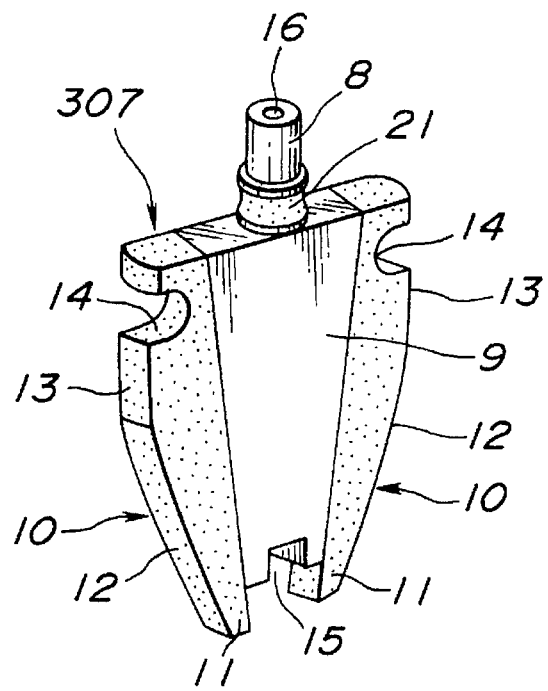
FIG. 9 is a perspective view of a flat diamond drill according to a further embodiment of the present invention.
Figure 10:
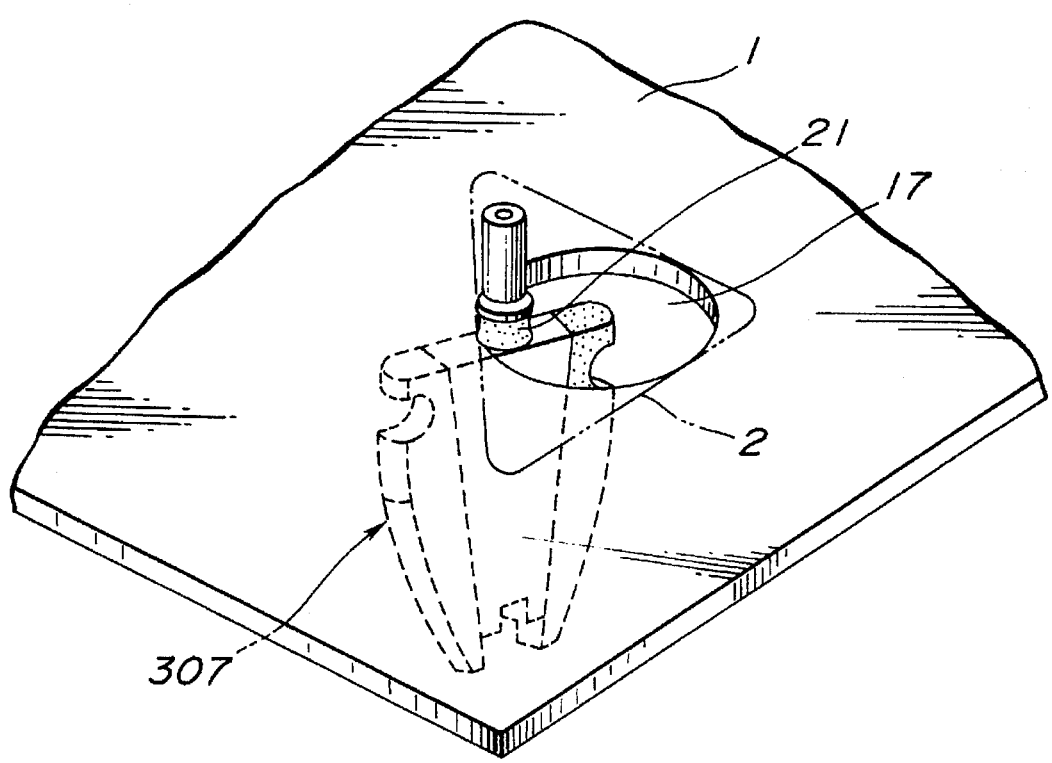
FIG. 10 is a perspective view for illustrating a process for drilling a non-circular opening in a glass plate.

FIGS. 9 and 10 show a flat diamond drill 307 according to a further embodiment. This embodiment differs from the previous embodiment of FIGS. 1 to 4 in that a diamond abrasive ring 21 is installed on the shank 8 at a location next to the core 9. The diamond abrasive ring 21 has a concave outer surface and an outer diameter which is a little larger than that of the shank 8.

With this diamond drill 307, the radius of a rounded corner of a non-circular opening, for example of a triangular opening 2, can be less than that in case the corner is rounded with the chamfering section 14 as in the previous embodiment of FIGS. 1 to 4. The radius of the corner can be minimumly reduced to about 2 to 3 mm.

As seen from FIG. 10, an improved drilling of a triangular opening 2 can be attained, that is, the finishing blade section 13 is sized so that a prepared opening 17 touches the three sides of a triangular opening 2 to be drilled. By this, the amount of glass to be removed by the diamond ring 21 can be reduced, thus making it possible to drill the triangular opening 2 with a further improved efficiency as well as to elongate the life of the abrasive diamond ring 21.

Figure 11:
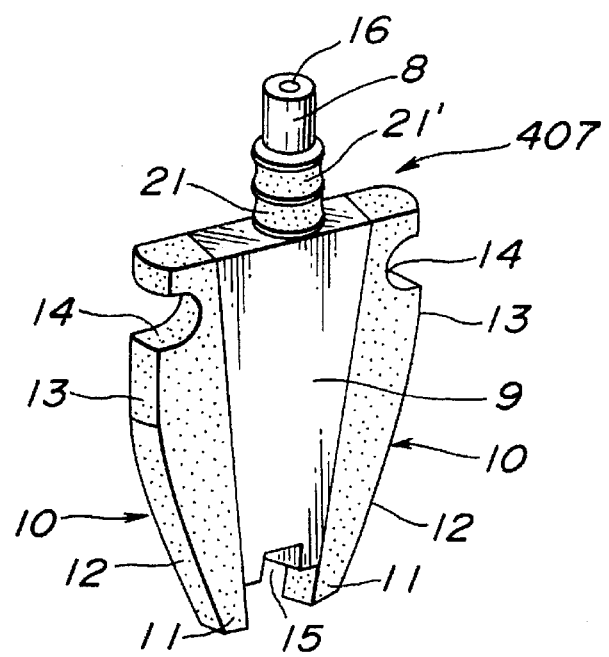
FIG. 11 is a perspective view of a flat diamond drill according to a further embodiment of the present invention.

FIG. 11 shows a flat diamond drill 407 according to a further embodiment of the present invention. This embodiment differs from the previous embodiment of FIG. 9 and 10 in that two abrasive diamond rings 21 and 21' are installed on the shank 8 and arranged one above another. The grain sizes of the diamond ring 21 are set within the range from No. 60 to No. 325 and the grain sizes of the diamond ring 21' are set within the range from No. 200 to No. 400 so that a high-speed drilling process is performed by means of the diamond ring 21 and a finishing process is performed by means of the diamond ring 21'. By this, a non-circular opening such as a triangular opening 2 of a high quality can be produced with ease and efficiency.

What is claimed is:

1. A flat diamond drill for drilling an opening in a glass plate, comprising:

a shank;

a core in the form of a flat plate and attached at a first longitudinal end to said shank for rotation therewith about an axis;

said core having opposed and tapered sides;

a pair of abrasive diamond tips composed of abrasive diamond grains, each of said abrasive diamond tips being secured to one of said tapered sides of said core and cooperating with said core to constitute a tip and core assembly in the form of a flat plate;

each of said diamond tips having a finishing blade section located adjacent the first longitudinal end of said core for providing a finishing blade of a first diameter corresponding to that of the opening to be formed in the glass plate, a cutting-off end section located adjacent a second longitudinal end of said core opposite to said first longitudinal end and protruding longitudinally outward therefrom for providing a cutting blade of a second diameter smaller than said first diameter, and a cutting blade section located between said cutting-off end section and said finishing blade section for providing a cutting blade which is convexly curved and of a diameter increasing gradually between said first and second diameters; and coolant supplying means for supplying coolant to said diamond tips and having a passage extending through said shank and said core to provide an outlet at said second longitudinal end of said core.

2. A flat diamond drill for drilling an opening in a glass plate, comprising:

a shank for attachment to a machine tool;

a core in the form of a flat plate and attached at a first longitudinal end to said shank for rotation therewith about an axis;

said core having opposed and tapered sides;

a pair of abrasive diamond tips composed of abrasive diamond grains, each of said abrasive diamond tips being secured to one of said tapered sides of said core and cooperating with said core to constitute a tip and core assembly in the form of a flat plate;

each of said diamond tips having a finishing blade section located adjacent the first longitudinal end of said core for providing a finishing blade of a first diameter corresponding to that of the opening to be formed in the glass plate, a cutting-off end section located adjacent a second longitudinal end of said core opposite to said first longitudinal end and protruding longitudinally outward therefrom for providing a cutting blade of a second diameter smaller than said first diameter, a cutting blade section located between said cutting-off end section and said finishing blade section for providing a cutting blade which is convexly curved and of a diameter increasing gradually between said first and second diameters, and a chamfering section located closer to said first longitudinal end of said core than to said finishing blade section for providing a finishing blade of a diameter smaller than said first diameter; and coolant supplying means for supplying coolant to said diamond tips having a passage extending through said shank and said core to provide an outlet at said second longitudinal end of said core.

3. A flat diamond drill according to claim 2, wherein said chamfering section comprises a U-shaped notch.

4. A flat diamond drill according to claim 2, wherein said chamfering section comprises a V-shaped notch.

5. A flat diamond drill according to claim 2, wherein said cutting-off end section is one of a pair of cutting-off end sections defined by said pair of abrasive diamond tips and said cutting-off end sections have opposed inner side surfaces which are tapered in a direction going away from said core and consist of first surface portions having nearest points of said inner side surfaces, which nearest points are diametrically opposed with respect to said axis of rotation of said shank and said core, and second surface portions which are slanted outward with respect to said first surface portions.

6. A flat diamond drill according to claim 5, wherein said diamond tips have such a thickness that is set in such a manner that a pair of lines extending through a point equidistant from said nearest points of said inner side surfaces and through opposite ends of one of said inner side surfaces when viewed in a plan view perpendicular to the axis of rotation of said drill form an angle within the range from 35° to 70°.

7. A flat diamond drill according to claim 2, wherein said second longitudinal end of said core is formed with a notched portion, and said outlet of said coolant supplying means is located at said notched portion.

8. A flat diamond drill according to claim 2, wherein said cutting blade provided by said cutting blade section has a convexly curved shape with a radius of curvature of about 1.5 to 2.5 times said first diameter.

9. A flat diamond drill according to claim 2, and further comprising an abrasive diamond ring installed on said shank and located at a junction between said shank and said core.

10. A flat diamond drill according to claim 9, wherein said abrasive diamond ring has a concave outer surface.

11. A flat diamond drill according to claim 2, and further comprising a first abrasive diamond ring installed on said shank and a second abrasive diamond ring installed on said shank above the first abrasive diamond ring, said first and second abrasive diamond rings being located adjacent said first longitudinal end of said core, one of said diamond rings being composed of diamond grains of grain sizes ranging from No. 60 to No. 325 and the other of said diamond rings being composed of diamond grains of grain sizes ranging from No. 200 to No. 600.

12. A flat diamond drill according to claim 11, wherein said diamond rings have concave outer surfaces of the same shape.

* * * * *